United States Patent [19]

Ducanis

[11] Patent Number: 4,566,358
[45] Date of Patent: Jan. 28, 1986

[54] BAR STOCK GUIDE ARRANGEMENT FOR SCREW MACHINES

[76] Inventor: Paul Ducanis, 17401 NW. 2nd Ave., Miami, Fla. 33169

[21] Appl. No.: 590,347

[22] Filed: Mar. 16, 1984

[51] Int. Cl.$^4$ .................. B23B 15/00; B23B 13/08
[52] U.S. Cl. .................. 82/38 A; 82/25; 82/63; 277/1 C; 414/431; 414/433
[58] Field of Search .................. 82/38 R, 38 A, 2.5, 82/2.7, 63; 279/1 C; 51/238 R, 238 S; 193/38; 308/6 R, 6 B, 4 R; 226/187, 167, 176, 177; 414/431, 433

[56] References Cited

U.S. PATENT DOCUMENTS

| | | | |
|---|---|---|---|
| 2,207,621 | 7/1940 | Hite | 279/110 |
| 2,903,307 | 9/1959 | Peters et al. | 308/6 B |
| 3,975,030 | 8/1976 | Akeel et al. | 279/4 |
| 4,000,797 | 1/1977 | Ducanis | 82/38 A |
| 4,030,585 | 6/1977 | Ducanis | 193/38 |
| 4,130,035 | 12/1978 | Langley | 82/38 |
| 4,240,645 | 12/1980 | Rohm | 279/1 C |
| 4,292,864 | 10/1981 | Cucchi et al. | 82/2.7 |
| 4,346,945 | 8/1982 | Tsuboi | 82/2.5 |
| 4,417,491 | 11/1983 | Uehara et al. | 82/2.7 |

Primary Examiner—Leonidas Vlachos
Assistant Examiner—Jerry Kearns
Attorney, Agent, or Firm—Oltman and Flynn

[57] ABSTRACT

A bar stock guide arrangement for screw machines having a rotatably mounted fitting which has a horizontal opening for loosely passing the bar stock and guide rollers in the fitting at circumferentially spaced locations around the bar stock. The guide rollers are on roller supports which are radially slidable in the fitting and have rack teeth on their opposite sides. Weights are slidable radially in the fitting between the successive roller supports, and these weights have rack teeth on their opposite sides. Pinion gears are removably mounted in the fitting to engage the rack teeth on the roller supports and the weights so that centrifugal force on each weight produces an inward force on the neighboring roller support. Springs bias the weights radially outward.

17 Claims, 12 Drawing Figures

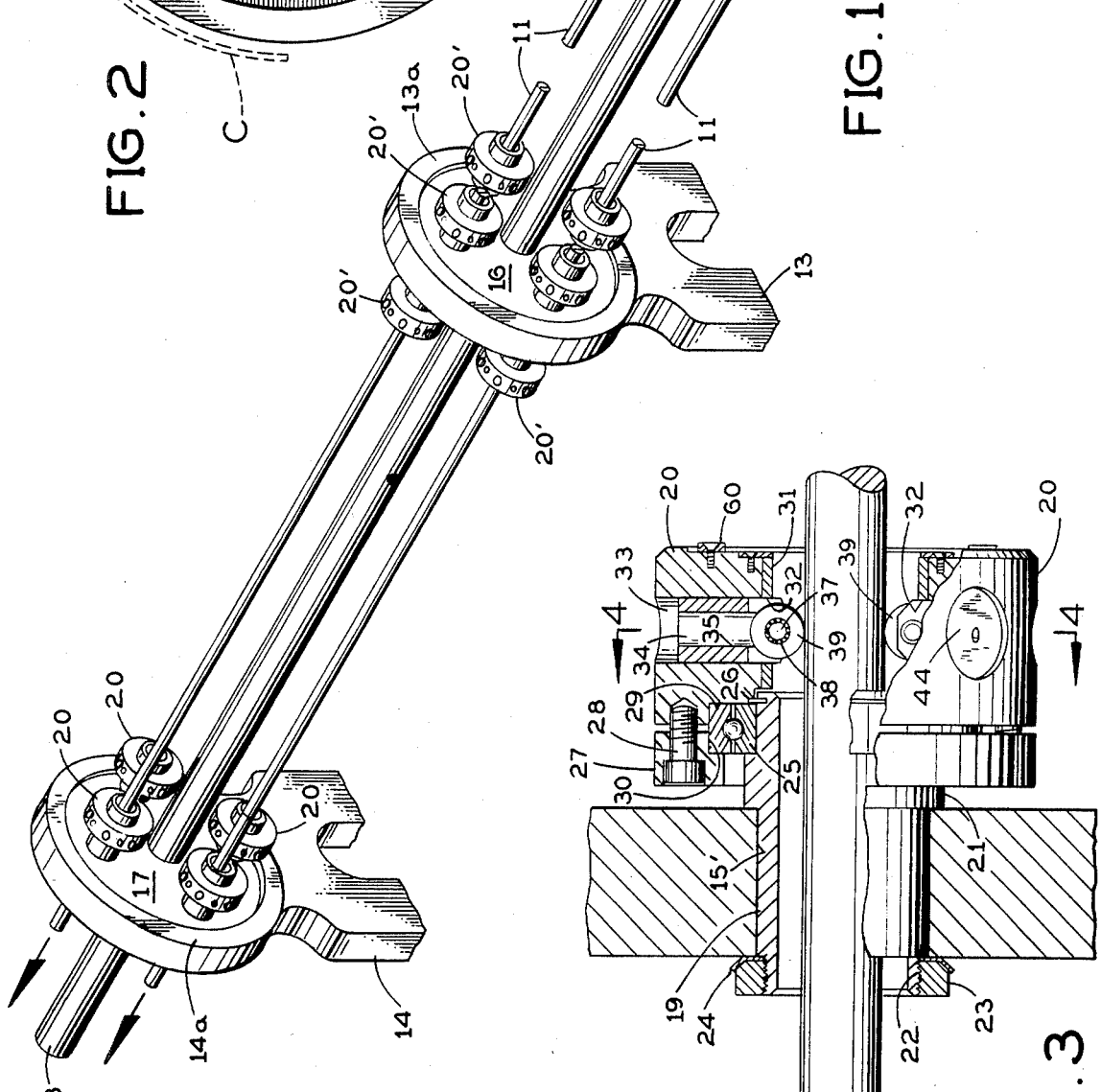

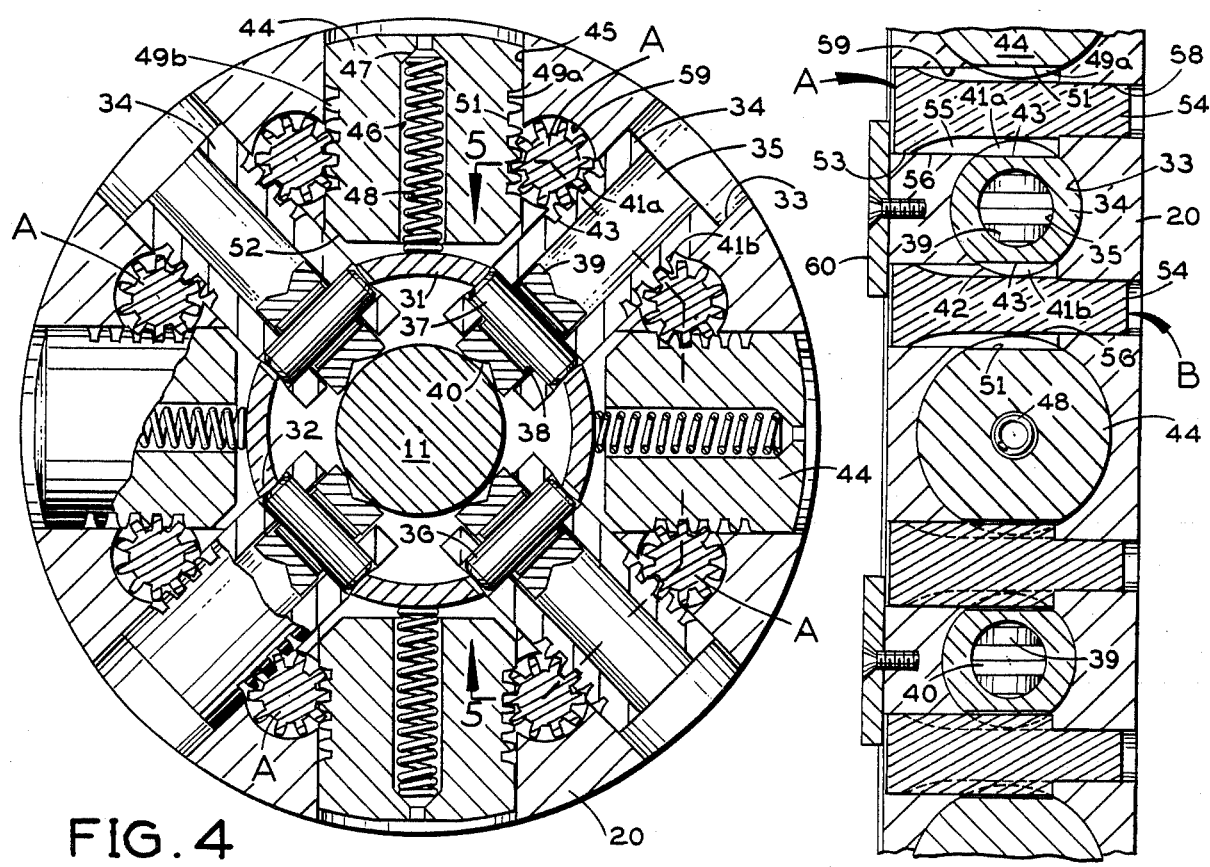
FIG. 4
FIG. 5
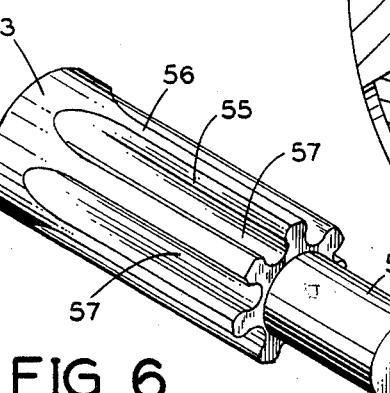
FIG. 6
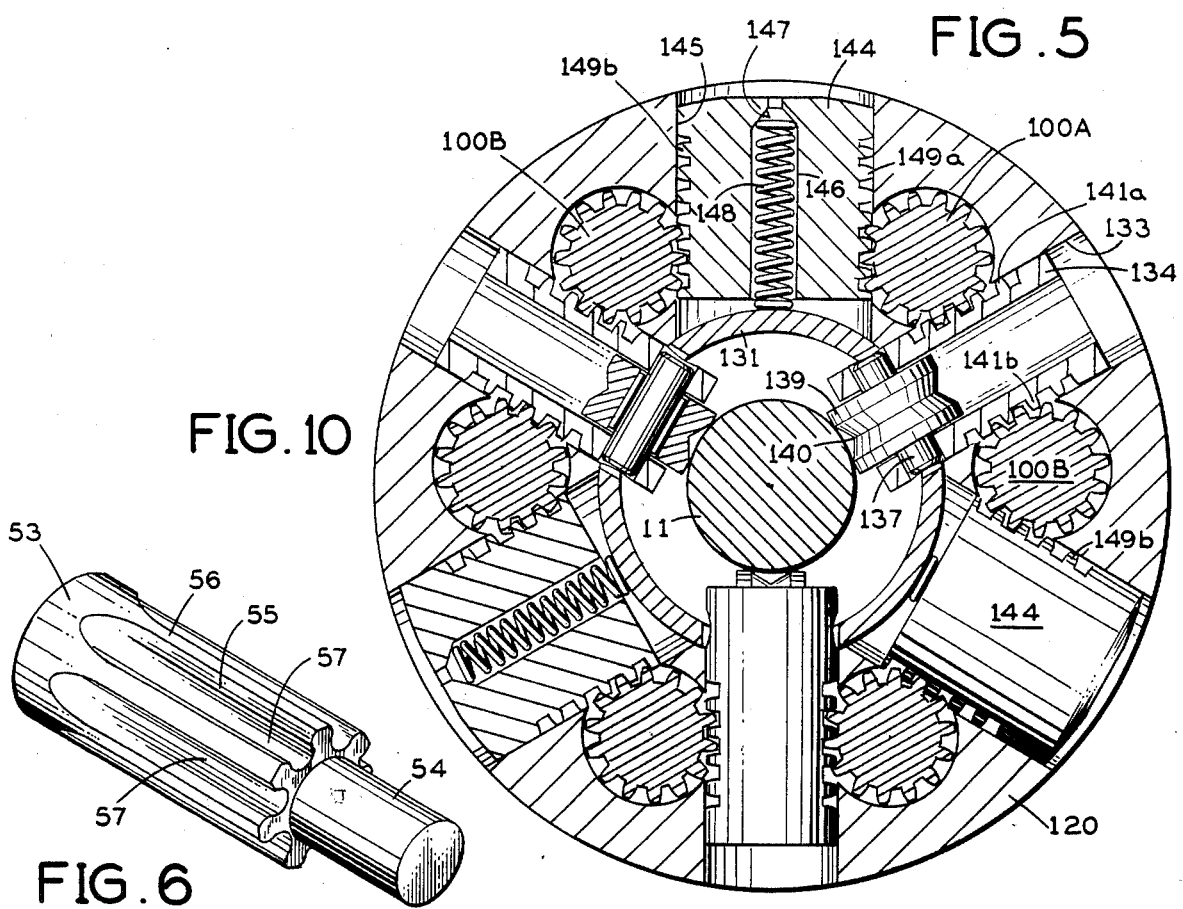
FIG. 10

BAR STOCK GUIDE ARRANGEMENT FOR SCREW MACHINES

BACKGROUND OF THE INVENTION

In the operation of screw machines of known design, the bar stock is fed into the machine in long lengths and has had a very considerable tendency to vibrate transverse to its length. Usually, the rotating bar stock is passed through an elongated guide tube held stationary at the inlet side of the screw machine. The rotating bar stock has a loose fit inside the non-rotating guide tube and it is free to vibrate transversely, striking the tube and thereby causing appreciable noise and often damaging the bar stock itself, particularly if it is of hexagonal or other polygonal, sharp cornered cross-section. Excessive noise in a machine shop is an occupational hazard which can be damaging to the safety, health and well-being of workers there and is contrary to federal policy, as expressed in the Occupational Safety and Health Act.

SUMMARY OF THE INVENTION

The present invention is directed to a novel bar stock guide arrangement for screw machines in which the usual continuous guide tube is eliminated. Instead, a novel fitting is provided at each of the usual cross plates which are spaced apart at intervals along the path of the bar stock at the inlet side of the screw machine. Each of these fittings provides circumferentially spaced guide members, preferably grooved rollers, which engage the bar stock on one side or on opposite sides of the cross plate and are free to revolve in unison with the bar stock when the latter is rotated by the screw machine. The bar stock need not be completely enclosed or confined throughout the relatively long intervals of its length between the fittings at successive cross plates at the inlet side of the machine and therefore the usual guide tube may be omitted.

The guide members in each fitting are mounted to slide laterally. Weights are mounted in each fitting at circumferentially spaced locations between successive guide members and are operatively coupled to the adjacent guide members to move laterally in opposite directions from them. Centrifugal force acting on the weights, as the fitting rotates, causes them to regulate the positions of the guide members laterally of the fitting, thereby opposing any tendency of the bar stock to vibrate laterally.

Preferably, the present bar stock guide arrangement is provided in a multiple array capable of handling several stock bars extending parallel to each other and rotatively indexed in succession into alignment with the chuck of the screw machine, so that one stock bar at a time is positioned to be fed into the machine.

With the present arrangement the problem of excessive noise is eliminated and at the same time the bar stock is properly supported and guided in alignment with the chuck of the screw machine. In addition, the present arrangement:

1. reduces the wear on the spindle bearings, collet, collet tube, pushers, feed tubes and stock feeding mechanism of the screw machine;
2. reduces the wear on and damage to the bar stock as it is advanced into the screw machine;
3. improves the feeding of the bar stock into the screw machine;
4. improves the accuracy with which the bar stock is machined in the screw machine; and
5. reduces chatter.

A principal object of this invention is to provide a novel and improved arrangement for guiding bar stock into a screw machine.

Another object of this invention is to provide such a bar stock guide arrangement which enables the previously used guide tubes to be eliminated.

Another object of this invention is to provide a novel bar stock guide arrangement which greatly reduces the noise occurring when the bar stock is fed into a screw machine.

Another object of this invention is to provide a novel bar stock guide arrangement which minimizes transverse vibration of the bar stock and the damage to the bar stock and to various parts of the screw machine which would be caused by excessive vibrations.

Another object of this invention is to provide a novel bar stock guide arrangement which uses centrifugal force to regulate the position of the bar stock as it is fed to a screw machine.

Further objects and advantages of this invention will be apparent from the following detailed description of certain presently-preferred embodiments thereof, shown in the accompanying drawings.

DESCRIPTION OF THE DRAWINGS

FIG. 1 is a perspective view showing the bar stock guide arrangement of the present invention at the inlet side of a multiple screw machine;

FIG. 2 is a vertical cross-section taken along the line 2—2 in FIG. 1 just beyond the first cross plate in this apparatus;

FIG. 3 is a longitudinal section taken along the line 3—3 in FIG. 2 through part of this cross plate and one of the present bar stock guide fittings carried by it;

FIG. 4 is a cross-section taken along the line 4—4 in FIG. 3 and showing a set of four guide rollers in this bar stock guide fitting engaging round bar stock;

FIG. 5 is a fragmentary section taken along the line 5—5 in FIG. 4;

FIG. 6 is a perspective view of one of the gears in the bar stock guide fitting of FIGS. 4 and 5;

FIG. 10 is a view similar to FIG. 4 and showing a second embodiment of the present bar stock guide fitting which has three rollers engaging round bar stock;

Figure 7:
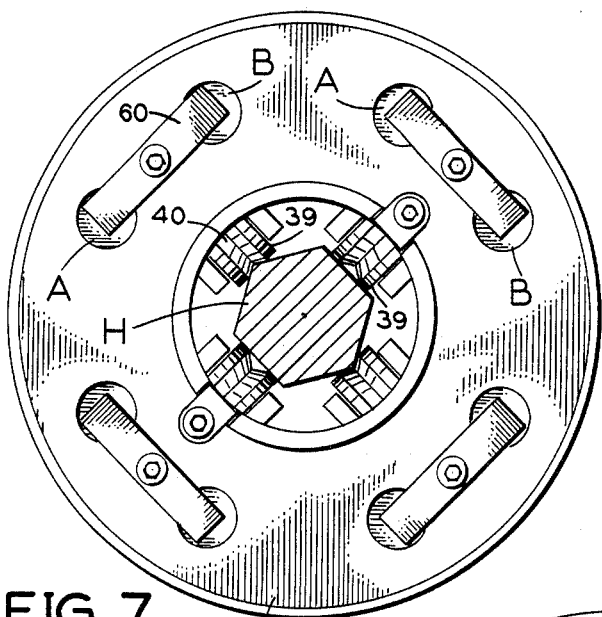
FIG. 7 is an end elevational view showing the bar stock guide fitting of FIG. 4 with its four guide rollers engaging hexagonal bar stock.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Referring first to FIG. 1, in a typical multiple screw machine (not shown), separate elongated bars of stock 11 extend parallel to each other at the inlet side of the screw machine. One bar 11 at a time is fed longitudinally into the screw machine and is rotated by the machine as it is screw-threaded in a known manner. Prior to the present invention, the common practice has been to provide a non-rotational guide tube for each bar 11 at the inlet side of the screw machine. The rotating bar stock would tend to vibrate transversely inside the non-rotating guide tube, producing excessive noise, sometimes damaging the bar stock, and tending to cause excessive wear on various parts of the screw machine.

In accordance with the present invention, rotatable, annular guide fittings are provided at suitable intervals along the length of each bar's travel at the inlet side of the screw machine. These guide fittings support and guide the bar, minimizing its tendency to vibrate transversely. Between successive guide fittings the bar is unconfined, there being no need for the usual guide tube of the prior art.

As shown in FIG. 1, three support standards 12, 13 and 14 are located in succession at suitable intervals along the path of the bar stock at the inlet side of the screw machine. It is to be understood that a greater or smaller number of such standards may be provided, as desired, extending up from the floor of the machine shop. The standards have respective rings 12a, 13a and 14a at their upper ends which rotatably receive and support corresponding rigid cross plates 15, 16 and 17 of circular outline. The cross plates are attached to a central shaft 18 which extends coaxially through the rings 12a, 13a and 14a. This shaft is arranged to be turned through successive quarter-turns so as to rotatively index the cross plates 15, 16 and 17 simultaneously as one bar 11 is used up in the screw machine and the next one is to be used.

Four identical annular fittings in accordance with the present invention are mounted in the first cross plate 15 at 90 degree intervals circumferentially. FIG. 3 shows one of these fittings in longitudinal section. This fitting has a non-rotatable, generally cylindrical sleeve 19 extending axially through a cylindrical horizontal opening 15' in cross plate 15 and rotatably supporting an annular housing 20 at the inner side (the side toward the screw machine) of cross plate 15. The bar stock 11 passes loosely through the inner sleeve 19 and housing 20.

As shown in FIG. 3, sleeve 19 has a slightly enlarged flange 21 for engagement with the inner end face of cross plate 15 (the face toward the screw machine). Just beyond the outer end face of cross plate 15, the outer end of sleeve 19 is externally screw-threaded at 22 to receive a clamping nut 23 for holding flange 21 tight against the inner end of this cross plate. A washer 24 is engaged between nut 23 and the outer end face of the cross plate.

At the inner side of its flange 21 the sleeve 19 supports a ball bearing 25, which is held in place against flange 21 by a snap ring 26 on the sleeve. The annular housing 20 is fastened to the outer race of bearing 25 by an annular clamping plate 27 and bolts 28. These bolts are tightened to hold plate 27 against the outer side of the outer race of the bearing (the side away from the screw machine) and hold the annular housing 20 against the inner side of this race (the side toward the screw machine). Housing 20 presents an annular recess 29 in its outer end which snugly receives the inner end of bearing 25, and clamping plate 27 presents a similar recess 30 in its inner end which snugly receives the outer end of the bearing.

The clamping bolts 28 are spaced at intervals circumferentially around plate 27 and housing 20.

As shown in FIGS. 3 and 4, the housing 20 holds a centrally located cylindrical sleeve 31 which is coaxial with the support sleeve 19 for this housing. Sleeve 31 at one location along its length is formed with four openings 32 at 90 degree intervals circumferentially.

Housing 20 is formed with four radial passages 33, each extending from the outer periphery of the housing to the central sleeve 31 at the location of a corresponding sleeve opening 32. Each housing passage 33 slidably receives a corresponding roller holder 34 having a cylindrical bore 35 along its entire length.

Near its inner end each roller holder 34 has a cylindrical cross bore 36 (FIG. 4) which registers with the corresponding opening 32 in sleeve 31. A cross pin 37 is tightly received non-rotatably in each cross bore 36. Needle bearings 38 are engaged between each cross pin 37 and a corresponding guide roller 39 to rotatably support the roller on the cross pin. Each guide roller 39 is formed with a peripheral V-groove 40 and on opposite sides of this groove the roller periphery is cylindrical for rolling engagement with the bar stock 11.

Toward its outer end on the outside each roller holder 34 is formed with two sets of rack teeth 41a and 41b diametrically opposite each other. The rack teeth of each set are arranged longitudinally of the roller holder. As shown in FIG. 5, the tip or outer land 42 of each rack tooth has a circular curvature circumferentially of the roller holder 34 and it has a close sliding fit in the corresponding housing bore 33. Between successive teeth of each set of rack teeth 41a and 41b the tooth space presents a bottom land 43 which is flat circumferentially of the roller holder, extending as the chord of a circle defined by the circumference of the roller holder 34 at either neighboring rack tooth.

Four relatively heavy weights 44 are slidably received in corresponding radial passages 45 of circular cross-section in housing 20 midway between the roller holders 34 in a direction circumferentially of the housing. Thus, the weights 44 are at 90 degree intervals from each other and at 45 degree intervals from the neighboring roller holders 34 on either side. Each weight 44 is formed with a centrally located recess 46 which is open at the radially inner end of the weight and has a tapered end wall 47 near the outer end of the weight. A coil spring 48 is engaged under compression between this end wall 47 and the outside of the central sleeve 31 carried by the housing 20, so that the spring biases the weight radially outward along the corresponding housing passage 45.

On the outside, each weight 44 is formed with two sets of rack teeth 49a and 49b diametrically opposite each other. The rack teeth on each weight are identical to the rack teeth 41a and 41b on the roller holders 34. As shown in FIG. 5, the tip or outer land 50 of each rack tooth on each weight 44 has a circular curvature circumferentially of the weight and it has a close sliding fit in the housing bore 45 which receives that weight. The tooth spaces between successive rack teeth on each weight present bottom lands 51, each of which is flat circumferentially of the weight, extending as the chord of a circle defined by the circumference of the weight at either neighboring rack tooth.

Each weight 44 has a continuous cylindrical periphery except at its inner end, which is beveled at 52, and at the spaces between its opposite sets of rack teeth 49a and 49b. The cylindrical periphery of each weight has a sliding fit inside the corresponding housing bore 45, so that the weight can slide radially in housing 20.

An individual pinion gear A meshes with the rack teeth 41a on each roller holder 34 and the rack teeth 49a on the next weight 44 counterclockwise from it in FIG. 4. An individual pinion gear B meshes with the rack teeth 41b on each roller holder and the rack teeth 49b on the next weight 44 clockwise in FIG. 4. Thus, there are four gears A and four gears B in this embodiment of the invention.

Each of these gears A and B is as shown in FIG. 6, presenting a cylindrical periphery 53 at one end, a smaller diameter cylindrical shaft 54 at the opposite end, and long gear teeth 55 between them. The tips or outer land 56 of the gear teeth 55 are long extensions of the cylindrical larger end 53 of the gear. The tooth spaces between successive gear teeth 54 present bottom lands 57.

As shown in FIG. 5, at the location of each gear A or B the housing 20 is formed with a corresponding axial bore 58 which rotatably receives the reduced shaft 54 of the corresponding gear. Bore 58 extends in from the outer side of housing 20 (the side away from the screw machine). The inner end of this bore opens into a coaxial conterbore 59 which rotatably receives the rest of the gear. Each bore 58 and the adjoining counterbore 59 constitute a longitudinal recess in the fitting which rotatably receives the corresponding gear A or B. The larger cylindrical end 53 of the gear has a rotatable fit in the corresponding counterbore 59. Counterbore 59 is open at the inner side of housing 20 (the side toward the screw machine) to enable the slidable insertion of the corresponding gear A or B. As shown in FIG. 4, each counterbore 59 on one side (circumferentially of housing 20) intersects a neighboring-radial housing passage 33 which slidably receives a roller holder 34, and on the opposite side it intersects a neighboring radial housing passage 45 which slidably receives a weight 44.

As shown in FIG. 2, four retainer plates 60 are bolted to the inner side of housing 20 (the side toward the screw machine). As shown in FIG. 5, each retainer plate 60 holds in the housing 20 the two gears A and B which are on opposite sides (circumferentially) of a corresponding roller holder 34. The gears A and B may be inserted in housing 20 while the roller holders 34 are manually positioned to center the bar stock.

As shown in FIGS. 4 and 5, the long outer lands 56 of the gear teeth 55 on each gear A or B have a close running fit with the flat bottom lands 43 of the tooth spaces in the set of rack teeth 41a or 41b on the adjacent roller holder 34. The outer lands of the gear teeth also have a close running fit with the bottom lands of the tooth spaces in the set of rack teeth 49a or 49 b on the adjacent weight 44.

OPERATION

In the operation of this guide arrangement, before the bar stock 11 begins rotating it is centered radially of the housing 20 and its central sleeve 31 by the four guide rollers 39. The springs 48 bias the weights 44 radially outward, and through the gears A and B these weights hold the roller holders 34 radially inward.

When the bar stock 11 is rotated by the screw machine, it causes the fitting housing 20 to rotate. The resulting centrifugal force on the weights 44 tends to force them radially outward, and through the gears A and B the weights force the roller holders 34 radially inward to maintain the corresponding rollers 39 in rolling engagement with the rotating bar stock.

Lateral displacement of the rotating bar stock 11 in one direction is resisted by the roller or rollers 39 on that side, which are held in by the adjacent centrifugal weights 44 acting through the corresponding gears A and B. Thus, bar stock displacement which tends to push a particular roller 39 and its holder 34 radially outward tends to rotate the adjacent gear A counterclockwise and the adjacent gear B clockwise. Such rotations of these gears forces the adjacent weights 44 radially inward, but such inward movement of a weight is opposed both by centrifugal force acting on it and the bias spring 48. Consequently, the overall effect of the rollers 39 and their holders 34, the gears A and B, and the weights 44 is to minimize lateral vibration of the bar stock 11 during its rotation.

FIG. 7 shows the guide fitting of FIGS. 2–6 engaging hexagonal bar stock H. In this embodiment, two opposite corners of the hex bar stock are received in the central grooves 40 on the corresponding rollers 39. The remaining two rollers 39 engage flats on the hex bar stock.

Figure 8:
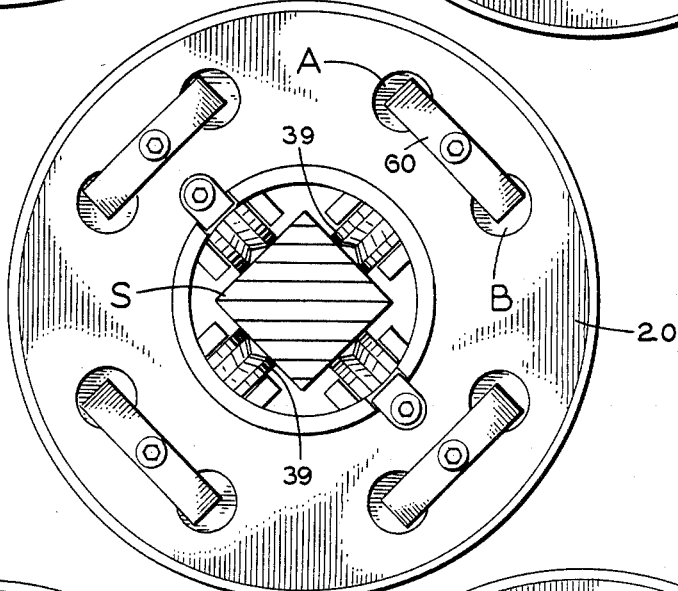
FIG. 8 is a similar view showing the four guide rollers engaging square bar stock.

FIG. 8 shows the guide fitting of FIGS. 2–6 engaging bar stock S of square cross-section. The rollers 39 are shown engaging corresponding flats on the bar stock. However, if desired the rollers could have their respective grooves 40 receiving the corners of the bar stock.

Figure 9:
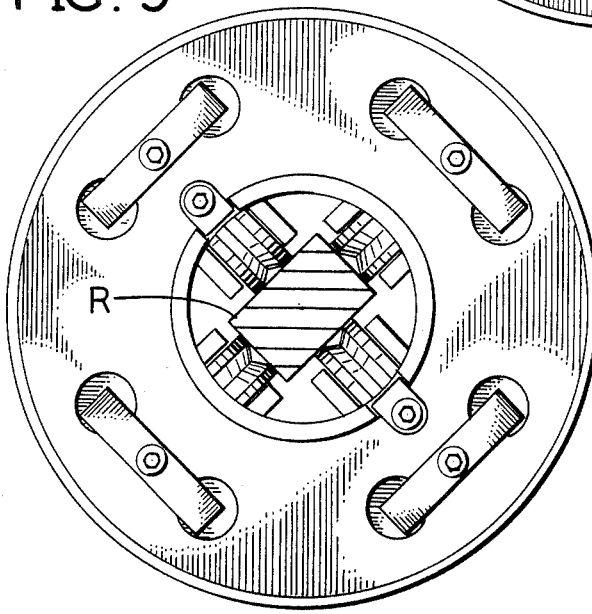
FIG. 9 is a similar view showing the four guide rollers engaging oblong rectangular bar stock.

FIG. 9 shows the guide fitting of FIGS. 2–6 engaging bar stock R of oblong rectangular cross-section, with the rollers 39 engaging corresponding flats on this bar stock. Since the gears A and B are readily removable and insertable, the oblong bar stock R may be initially centered by positioning the roller holders 34 with the gears A and B removed, after which the gears may be inserted to couple the roller holders to the weights 44.

FIG. 10 shows a second embodiment of the invention which has just three guide rollers for engagement with the bar stock. Elements of this second embodiment which correspond to the elements of the first embodiment are given the same reference numerals plus 100 as those in FIGS. 2–6, making a detailed recitation of these elements unnecessary.

FIG. 10 shows the three grooved guide rollers 139 at 120 degree intervals circumferentially of the bar stock 111 and the three slidable weights 144 at similar 120 degree intervals from each other and midway between the guide rollers. The operation of this second embodiment is substantially the same as the first embodiment, with the gears 100A and 100B coupling the roller holder 134 to the weights 144 (and vice versa) in the same manner.

Figure 11:
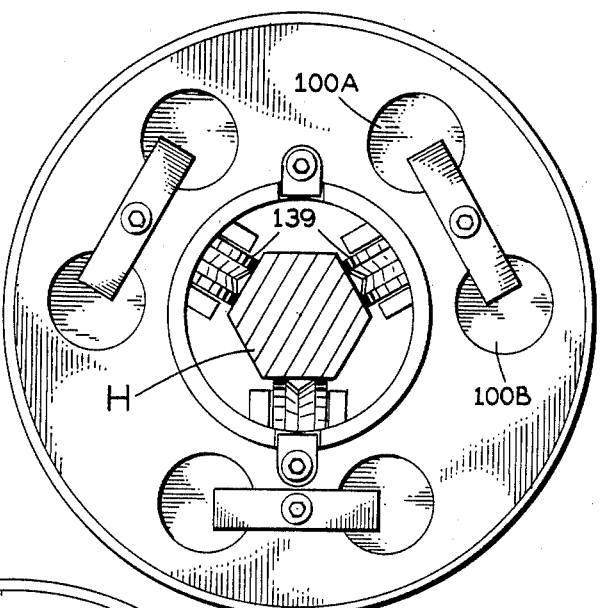
FIG. 11 is an end elevation showing the bar stock guide fitting of FIG. 10 with its three guide rollers engaging hexagonal bar stock.

FIG. 11 shows this second embodiment of the present guide fitting engaging hexagonal bar stock H. The three guide rollers 139 engage corresponding flats on the bar stock.

Figure 12:
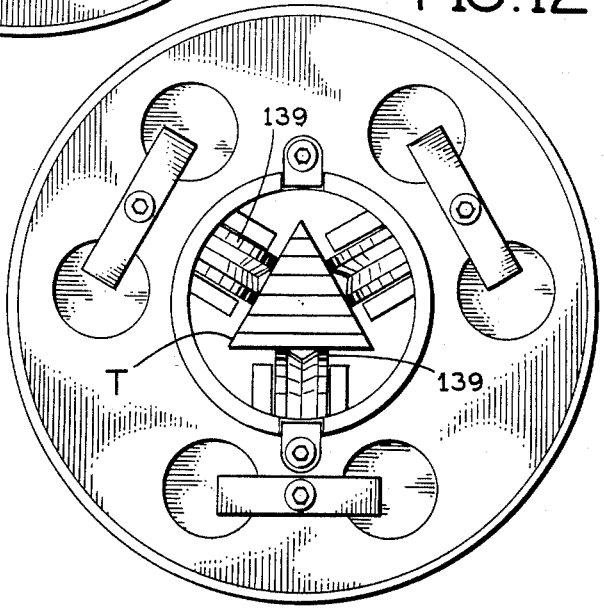
FIG. 12 is a similar view showing the three guide rollers engaging triangular bar stock.

FIG. 12 shows the second embodiment of the present guide fitting engaging bar stock T of equilateral triangular cross-section. The three guide rollers 137 engage corresponding flats on the bar stock.

I claim:

1. In a bar stock guide arrangement at the inlet side of a screw machine, said guide arrangement comprising:
   a plurality of rigid cross plates spaced apart at intervals along the path of the bar stock at the inlet side of the screw machine and having substantially horizontal openings therethrough for passing the bar stock;

a plurality of annular fittings defining a longitudinal passageway for the bar stock;

means rotatably mounting each fitting in a corresponding cross plate at said opening therein for permitting the fitting to rotate in unison with the bar stock when the bar stock is rotated by the screw machine;

and a plurality of rollers mounted in each fitting at circumferentially spaced locations around said longitudinal passageway for rolling engagement with the bar stock at different circumferential locations thereon;

the improvement which comprises:

a plurality of weights slidably mounted in each fitting at circumferentially spaced locations around said longitudinal passageway for the bar stock to be urged laterally outward by centrifugal force as said fitting rotates;

means acting between said weights and said rollers to hold the rollers laterally inward against the bar stock in response to the urging of said weights outward by centrifugal force;

each of said weights being positioned between a pair of said rollers circumferentially around said longitudinal passageway for the bar stock;

and said means acting between said weights and said rollers comprising:

a holder for each roller slidably mounted in the corresponding fitting for movement laterally of said longitudinal passageway and having rack teeth on its opposite sides circumferentially around said longitudinal passageway;

rack teeth on the opposite sides of each of said weights circumferentially around said longitudinal passageway;

and respective pinion gears engaged between said holders and the neighboring weights and meshing with the rack teeth thereon to force said holders inward when centrifugal force urges said weights outward.

2. A bar stock guide arrangement according to claim 1 and further comprising a respective spring biasing each of said weights laterally outward.

3. A bar stock guide arrangement according to claim 1 wherein:

each of said fittings has a plurality of circumferentially spaced, radially extending, cylindrical bores which slidably receive said roller holders;

each of said roller holders has a substantially cylindrical periphery slidably engaging the corresponding bore in the corresponding fitting, the rack teeth on each roller holder have substantially cylindrical outer lands, and between successive rack teeth each roller holder presents a tooth space with a flat bottom land extending as the chord of a circle defined by the periphery of either adjacent rack tooth;

each of said fittings has an additional plurality of radially extending cylindrical bores located circumferentially of the fitting midway between the bores which receive the roller holders;

each of said weights has a substantially cylindrical periphery slidably engaging the corresponding additional bore in the corresponding fitting, the rack teeth on each weight have substantially cylindrical outer lands, and between successive rack teeth each weight presents a tooth space with a flat bottom land extending as the chord of a circle defined by the periphery of either adjacent rack tooth;

each of said fittings has a plurality of longitudinally extending recesses, each located between and intersecting one of said radial bores which receives a roller holder and one of said radial bores which receives a weight;

each of said gears is rotatably received in a corresponding longitudinal recess and has gear teeth thereon which are received in the tooth spaces on the roller holder and the weight in the respective radial bores on opposite sides of that longitudinal recess, and each gear tooth on each gear has an outer land of cylindrical curvature which is elongated longitudinally of the fitting and is closely received in the tooth spaces on the roller holder and the weight on opposite sides of said gear to restrain said roller holder and said weight from rotating in the corresponding radial bores.

4. A bar stock guide arrangement according to claim 3 wherein:

each of said gears is slidably insertable into the corresponding longitudinal recess from one side of the corresponding fitting;

and further comprising:

a plurality of retainer plates detachably fastened to said one side of each fitting and extending across said longitudinal recesses to hold the corresponding gears therein.

5. A bar stock guide arrangement according to claim 4 wherein:

each of said retainer plates extends across two neighboring longitudinal recesses in the corresponding fitting to retain the corresponding gears in said recesses.

6. A bar stock guide arrangement according to claim 4 wherein:

each of said longitudinal recesses presents a counterbore which at one end is open at said one side of the fitting and a smaller bore extending coaxially from the opposite end of said counterbore;

and each of said gears has a cylindrical shaft segment rotatably received in the bore of the corresponding longitudinal recess and a gear-toothed segment rotatably received in the counterbore of that longitudinal recess.

7. A bar stock guide arrangement according to claim 6 wherein:

each of said retainer plates extends across two neighboring longitudinal recesses in the corresponding fitting to retain the corresponding gears in said recesses.

8. A bar stock guide arrangement according to claim 7 wherein:

each of said fittings has a central, longitudinally extending, annular sleeve dimensioned to pass the bar stock loosely;

and further comprising:

a plurality of coil springs in each fitting engaged under compression between said central sleeve and said weights to bias the weights radially outward.

9. In a bar stock guide arrangement at the inlet side of a screw machine, said guide arrangement comprising:

a rigid cross plate positioned along the path of the bar stock at the inlet side of the screw machine and having a substantially horizontal opening therethrough for passing the bar stock;

an annular fitting defining a longitudinal passageway for the bar stock;

means rotatably mounting said fitting in said cross plate at said opening therein for permitting the fitting to rotate in unison with the bar stock when the bar stock is rotated by the screw machine;

and a plurality of guide members mounted in said fitting at circumferentially spaced locations around said longitudinal passageway for engagement with the bar stock at different circumferential locations thereon to guide the bar stock through the fitting, said guide members being movable in the fitting radially of said longitudinal passageway for the bar stock;

the improvement which comprises:

a plurality of weights slidably mounted in said fitting between successive guide members at circumferentially spaced locations around said longitudinal passageway for the bar stock, each of said weights being slidable radially outward under centrifugal force as said fitting rotates;

means acting between said weights and said guide members for urging each guide member radially opposite to the radial movement of the adjacent weights so that the weights regulate the radial positions of the guide members;

and said means acting between said weights and said rollers comprising:

a holder for each guide member slidably mounted in said fitting for movement radially of said longitudinal passageway and having rack teeth on its opposite sides circumferentially around said longitudinal passageway;

rack teeth on the opposite sides of each of said weights circumferentially around said longitudinal passageway;

and respective pinion gears engaged between said holders and the neighboring weights and meshing with the rack teeth thereon to force said holders inward when centrifugal force urges said weights outward.

10. A bar stock guide arrangement according to claim 9 and further comprising a respective spring biasing each of said weights laterally outward.

11. In a bar stock guide arrangement at the inlet side of a screw machine, said guide arrangement comprising:

a rigid cross plate located along the path of the bar stock at the inlet side of the screw machine and having a substantially horizontal opening therethrough for passing the bar stock;

an annular fitting defining a longitudinal passageway for the bar stock;

means rotatably mounting said fitting in said cross plate at said opening therein for permitting the fitting to rotate in unison with the bar stock when the bar stock is rotated by the screw machine;

and a plurality of rollers mounted in said fitting at circumferentially spaced locations around said longitudinal passageway for rolling engagement with the bar stock at different circumferential locations thereon;

the improvement which comprises:

a plurality of weights slidably mounted in said fitting at circumferentially spaced locations around said longitudinal passageway for the bar stock to be urged laterally outward by centrifugal force as said fitting rotates;

means acting between said weights and said rollers to hold the rollers laterally inward against the bar stock in response to the urging of said weights outward by centrifugal force;

each of said weights being positioned between a pair of said rollers circumferentially around said longitudinal passageway for the bar stock;

and said means acting between said weights and said rollers comprising:

a holder for each roller slidably mounted in said fitting for movement laterally of said longitudinal passageway and having rack teeth on its opposite sides circumferentially around said longitudinal passageway;

rack teeth on the opposite sides of each of said weights circumferentially around said longitudinal passageway;

and respective pinion gears engaged between said holders and the neighboring weights and meshing with the rack teeth thereon to force said holders inward when centrifugal force urges said weights outward.

12. A bar stock guide arrangement according to claim 11 and further comprising a respective spring biasing each of said weights laterally outward.

13. A bar stock guide arrangement according to claim 11 wherein:

said fitting has a plurality of circumferentially spaced, radially extending, cylindrical bores which slidably receive said roller holders;

each of said roller holders has a substantially cylindrical periphery slidably engaging the corresponding bore in the fitting, the rack teeth on each roller holder have substantially cylindrical outer lands, and between successive rack teeth each roller holder presents a tooth space with a flat bottom land extending as the chord of a circle defined by the periphery of either adjacent rack tooth;

said fitting has an additional plurality of radially extending cylindrical bores located circumferentially of the fitting midway between the bores which receive the roller holders;

each of said weights has a substantially cylindrical periphery slidably engaging the corresponding additional bore in the fitting, the rack teeth on each weight have substantially cylindrical outer lands, and between successive rack teeth each weight presents a tooth space with a flat bottom land extending as the chord of a circle defined by the periphery of either adjacent rack tooth;

each of said fittings has a plurality of longitudinal recesses, each located between and intersecting one of said radial bores which receives a roller holder and one of said radial bores which receives a weight;

each of said gears is rotatably received in a corresponding longitudinal recess and has gear teeth thereon which are received in the tooth spaces on the roller holder and the weight in the respective radial bores on opposite sides of that longitudinal recess, and each gear tooth on each gear has an outer land of cylindrical curvature which is elongated longitudinally of the fitting and is closely received in the tooth spaces on the roller holder and weight on opposite sides of said gears to restrain said roller holder and said weight from rotating in the corresponding radial bores.

14. A bar stock guide arrangement according to claim 13 wherein:
each of said gears is slidably insertable into the corresponding longitudinal recess from one side of the fitting;
and further comprising:
a plurality of retainer plates detachably fastened to said one side of said fitting and extending across said longitudinal recesses to hold the corresponding gears therein.

15. A bar stock guide arrangement according to claim 14 wherein:
each of said longitudinal recesses presents a counterbore which at one end is open at said one side of the fitting and a smaller bore extending coaxially from the opposite end of said counterbore;
and each of said gears has a cylindrical shaft segment rotatably received in the bore of the corresponding longitudinal recess and a gear-toothed segment rotatably received in the counterbore of that longitudinal recess.

16. A bar stock guide arrangement according to claim 15 wherein:
said fitting has a central, longitudinally extending, annular sleeve dimensioned to pass the bar stock loosely;
and further comprising:
a plurality of coil springs engaged under compression between said central sleeve and corresponding weights and biasing said weights radially outward.

17. A bar stock guide arrangement according to claim 11 wherein:
said fitting has a central, longitudinally extending, annular sleeve dimensioned to pass the bar stock loosely;
and further comprising:
a plurality of coil springs engaged under compression between said central sleeve and said weights to bias the weights radially outward.

* * * * *